United States Patent [19]
Channin et al.

[11] 3,736,525
[45] May 29, 1973

[54] UNITIZED INTERNALLY MODULATED GAS LASER

[75] Inventors: Donald Jones Channin, Jacob Meyer Hammer, both of Princeton, N.J.

[73] Assignee: RCA Corporation, New York, N.Y.

[22] Filed: Dec. 6, 1971

[21] Appl. No.: 204,812

[52] U.S. Cl..................................331/94.5, 350/160
[51] Int. Cl...............................................H01s 3/11
[58] Field of Search .....................331/94.5; 350/160

[56] References Cited
UNITED STATES PATENTS

| 3,247,386 | 4/1966 | Vickery | 331/94.5 |
| 3,581,230 | 5/1971 | Smith | 331/94.5 |
| 3,389,348 | 6/1968 | De Maria | 331/94.5 |

*Primary Examiner*—William L. Sikes
*Attorney*—Edward J. Norton, George J. Seligsohn, Glenn H. Bruestle and Irwin M. Krittman

[57] ABSTRACT

A unitized, integral, acousto-optic, internally modulated gas laser, which may be mass-produced as a single article of manufacture.

11 Claims, 2 Drawing Figures

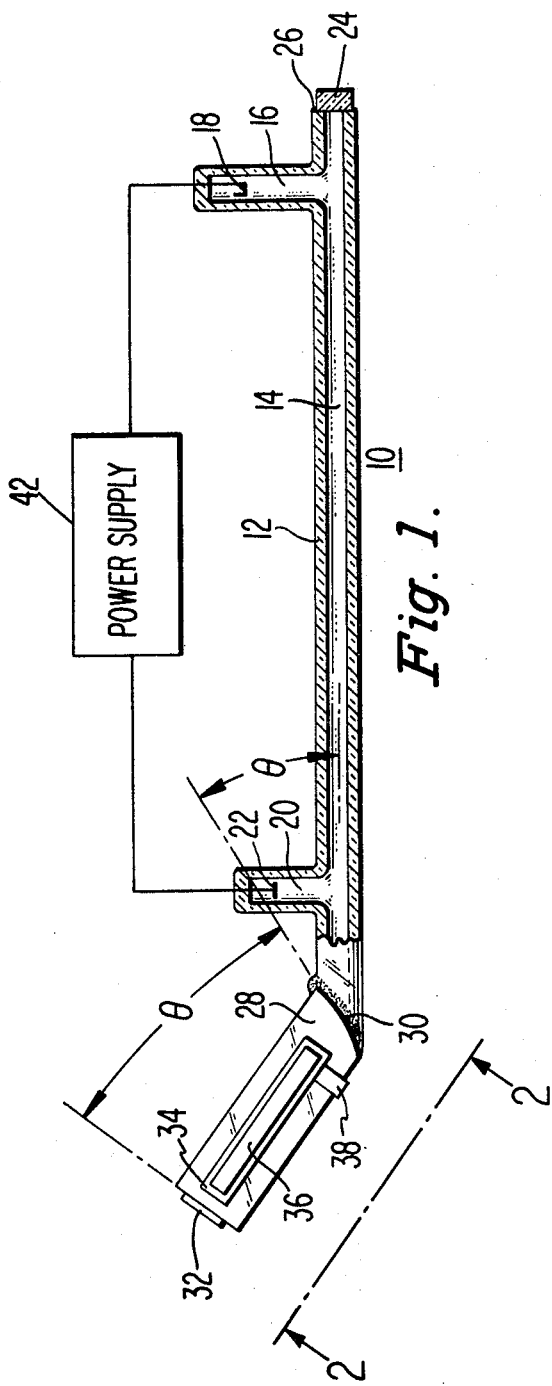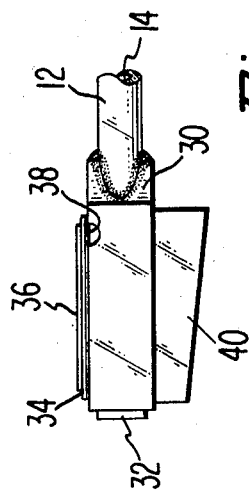

UNITIZED INTERNALLY MODULATED GAS LASER

This invention relates to internally modulated lasers and, more particularly, to an internally modulated gas laser.

Internal laser modulators are known in the art and have been employed, by way of example, to Q-switch a pulsed laser as well as to modulate a CW laser in accordance with an analog signal. Briefly, an internally modulated laser includes an optical resonant cavity within which are situated an active laser medium and a modulation means oriented in serial relationship with respect to each other.

The active lasing medium in an internally modulated laser may be a solid state crystal, such as ruby; a semiconductor diode, such as galium arsenide, or a gas, such as helium-neon. However, a gas active lasing medium is not employed frequently in an internally modulated laser. The reason for this is that gas lasing mediums have relatively the lowest gains of all active lasing mediums.

The modulation means, which may take various known form, such as an electro-optic modulator or an acousto-optic modulator, has in the past normally been oriented in spaced relationship with the active lasing medium. This is particularly true of a gas lasing medium, since the gas must be retained within an envelope. This type of arrangement, which requires a system of separate elements each held in proper orientation with respect to the others, has up to now prevented an internally-modulated gas laser from being manufactured as a unitary article, in which all the required elements thereof are integral.

The present invention is directed to a unitized, integral, acousto-optic, internally modulated gas laser, which may be mass-produced as a single article of manufacture.

The features and advantages of the present invention will become apparent from the following detailed description, taken together with the accompanying drawing, in which:

FIG. 1 illustrates a preferred embodiment of the present invention, and

FIG. 2 illustrates a portion of FIG. 1 from a different point of view.

Referring now to FIG. 1, laser 10 includes tubular member 12 having longitudinal bore 14 therethrough. Tubular member 12 is provided with a cathode region 16, in which cathode 18 is located, and an anode region 20, in which anode 22 is located.

Terminating means 24 is attached to and seals the right open end of tubular member 12. This is preferably accomplished with a low vapor pressure, vacuum-sealing epoxy. Disposed on the inner surface of terminating means 24, in direct contact with the right end of bore 14, is first dielectric reflector 26, which defines one end of an optical resonant cavity.

As shown in FIGS. 1 and 2, acousto-optic solid member 28 has its right end 30 attached to and sealing the open left end of tubular member 12. This is also preferably accomplished with a low vapor pressure, vacuum-sealing epoxy.

Right end 30 of solid member 28 is cut at a given angle with respect to the length of bore 14. As shown, in FIG. 1, this angle is $\theta$. The given angle $\theta$ is made equal to the complement of Brewster's angle, in accordance with the following expression:

$$\theta = 90° - \arctan n,$$

where $n$ is the index of refraction of acousto-optic solid member 28 at the lasing wavelength.

The surface of end 30 should be optically polished flat in the particular region thereof which is in cooperative relationship with the portion of bore 14, adjacent thereto, through which the laser beam passes. However, the periferal regions of surface 30 may be rounded to facilitate the proper orientation of bore 14 with solid member 28 during the attachment of tubular member 12 thereto.

The Figure of merit of an acousto-optic material is a function of n, its index of refraction for light of the given wavelength passing therethrough, $p$ its photoelastic coupling component, $\rho$ its density, and V the velocity of sound therein. In particular, the figure of merit M is defined by the following equation:

$$M = n^6 p^2/\rho V^3$$

Acousto-optic solid member 28 is composed of a material having a relatively high figure of merit M. Suitable materials include a glass such as Schott SF 56, SF 58 or SF 59, fused quartz, or a crystalline material such as lead molybdate. Schott SF 56 glass has an index of refraction at 6,328A. of 1.78; an acoustic velocity of $3.74 \times 10^5$ cm/sec.; and a density of 4.92 gm/cm$^3$. The corresponding parameters of Schott SF 58 glass have the respective values of 1.91; 3.32; and 4.95, while the corresponding parameters of Schott SF 59 glass have the respective values 1.94; 3.00; and 6.26. The photoelastic coupling component can be considered to be a constant among these three glasses.

As shown in FIG. 1, the left end of solid member 28 is cut at the aforesaid angle $\theta$ with respect to the right end thereof. It can be shown that under these conditions the direction of travel of the refracted light in solid member 28 is normal to the surface of the left end of solid member 28.

A second dielectric reflector 32 is deposited directly on the surface of the left end of solid member 28. Second reflector 32 defines the left end of the optically resonant cavity. In order to obtain an output from the laser at least one of reflectors 26 and 32 is made partially transmissive.

A suitable piezoelectric material 34, such as PZT, is bonded to the top surface of solid member 28, as shown in FIGS. 1 and 2. For the purpose of applying an external modulating signal, piezoelectric material 34 is provided with top electrode 36 and bottom electrode 38. As shown, the connection portion of bottom electrode 38 maybe situated in a channel in the top surface of member 28.

Bonded to the bottom surface of solid member 28 is a suitable sound absorbing structure 40, composed of aluminum or other sound absorbing material, as shown in FIG. 2.

Filling bore 14, cathode region 16 and anode region 20 of laser 10 is a suitable lasing gas, such as helium-neon for example. Other known lasing gases or metal vapors may also be used.

In order to operate laser 10, a suitable discharge voltage from power supply 42 is applied between cathode 18 and anode 22. This causes a discharge plasma to take place in the enclosed space defined by bore 14 cathode region 16 and anode region 20. Further, a modulating signal, which may consist of a modulated r.f. voltage from a source (not shown) having a suitable frequency in the range of 5 – 50 MHz is applied between electrodes 36 and 38. This launches an acoustic wave which travels from the top surface to the bottom surface of solid member 28, where it is absorbed by structure 40.

As is known, the acousto-optic properties of solid member 28 result from a phase grating, formed by changes in the index of refraction resulting from the diffracting light traveling through solid member 28.

The optical resonant cavity defined by reflectors 26 and 32 will cause photons at the lasing wavelength produced by stimulated emission in the plasma within bore 14 generating a beam of laser light which travels back and forth between reflectors 26 and 32, through both bore 14 and solid member 28. The beam of laser light is refracted by the interface at right end 30 of solid member 28. The intensity of the laser light produced depends upon the effective overall gain of laser 10, taking into account all laser light which is lost either as an output, by transmission through partially transmissive reflector 24 and/or reflector 32, or by losses which limit the circulating laser light in the optical resonant cavity.

The effect of the pulse grating formed by the traveling acoustic wave within solid member 28 is to diffract the laser light so that only a portion of the laser light remains in the zero diffraction order, while the remainder of the laser light in solid member 28 appears in higher diffraction orders. The angular spacing between orders depends on the frequency of the modulating signal. However, the relative intensities of the laser light in each respective order depends upon the amplitude of the modulating signal. In particular, as the amplitude of the modulating signal approaches zero, the relative intensity of the laser light in the zero order approaches a maximum; while as the amplitude of the modulating signal approaches a maximum, the relative intensity of the laser light in the zero order approaches a minimum. Since all of the circulating laser light which is retained within the optical resonant cavity comes solely from the zero order, the intensity of the laser light is thereby modulated in accordance with the modulating signal applied across piezoelectric element 34.

The fact that gas lasers inherently have poor gain turns out to be a benefit in the case of laser 10, since it means that 100 percent modulation may be achieved with a relatively small swing in amplitude of the modulating signal.

Modifications of the preferred embodiment shown in FIGS. 1 and 2 may be made without departing from the present invention. For instance, right end 30 of solid member 28 may be cut at an arbitrary angle (including normal to bore 14) providing that suitable antireflection coatings are employed. In this case, the left end of solid member 28, on which reflector 32 is deposited, is still cut perpendicular to the direction of travel of the lasing light in solid member 28 after refraction at right end 30 of member 28.

Further, solid member 28 acts as a prism capable of dispersing incident light of different wave lengths. By properly choosing the value of the given angle $\theta$, a desired single frequency mode of an active lasing gas capable of multi-mode lasing may be selected and the other modes thereof suppressed.

What is claimed is:

1. An internally modulated gas laser comprising a tubular member having a longitudinal bore and first and second opposite open ends, terminating means connected to and sealing said first end of said tubular member, an acousto-optic solid member having one end thereof attached to and sealing said second end, whereby said tubular member, said terminating means and said solid member cooperate to form a laser enclosure, an active lasing gas filling said enclosure, a reflector disposed on the opposite end said solid member from said one end thereof, and piezoelectric means bonded to said solid member for launching traveling acoustic wave through said solid member in response to an applied modulating signal.

2. The laser defined in claim 1, wherein said active lasing gas is He-Ne.

3. The laser defined in claim 1, wherein said solid material is glass.

4. The laser defined in claim 3, wherein said glass has an index of refraction at 6,328A in the range from about 1.78 to about 1.94, an acoustic velocity in the range from about $3.74 \times 10^5$ cm/sec. to about $3.00 \times 10^5$ cm/sec., and a density in the range from about 4.92 gm/cm$^3$ to about 6.26 gm/cm$^3$.

5. The laser defined in claim 1, wherein said solid material is fused quartz.

6. The laser defined in claim 1, wherein said solid material is lead molybdate.

7. The laser defined in claim 1, wherein said reflector is partially transmissive.

8. The laser defined in claim 1, wherein said solid material has an index of refraction $n$, and wherein said one end of said solid means lies substantially in a plane disposed at a given angle equal to the complement of arc tan $n$ with respect to said longitudinal bore.

9. The laser defined in claim 8, wherein said reflector has a surface which is coincident with the surface of said opposite end of said solid member and wherein the surface of said opposite end of said solid member is substantially in a second plane disposed at an angle equal to twice said given angle with respect to said longitudinal bore, whereby said second plane is substantially perpendicular to the direction of travel of laser light through said solid member.

10. The internally modulated laser defined in claim 1, wherein said terminating means includes a second reflector oriented with respect to said first-named reflector to define an optical resonant cavity for supporting laser light traveling the length of said bore and said solid member.

11. The internally modulated laser defined in claim 10, wherein at least one of said reflectors is partially transmissive.

* * * * *